May 1, 1934.  R. N. HARTZELL  1,957,166
CUTTER HEAD FOR VENEER MACHINES
Original Filed Jan. 26, 1931  3 Sheets-Sheet 2
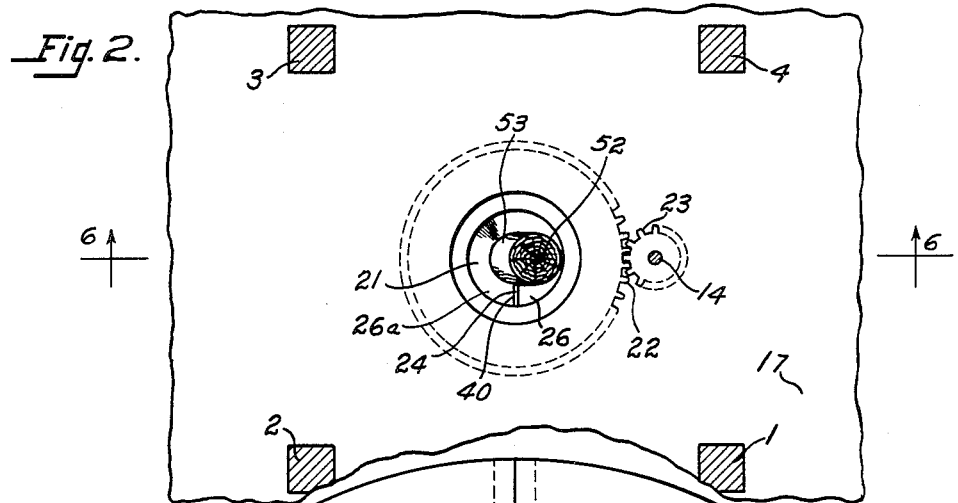
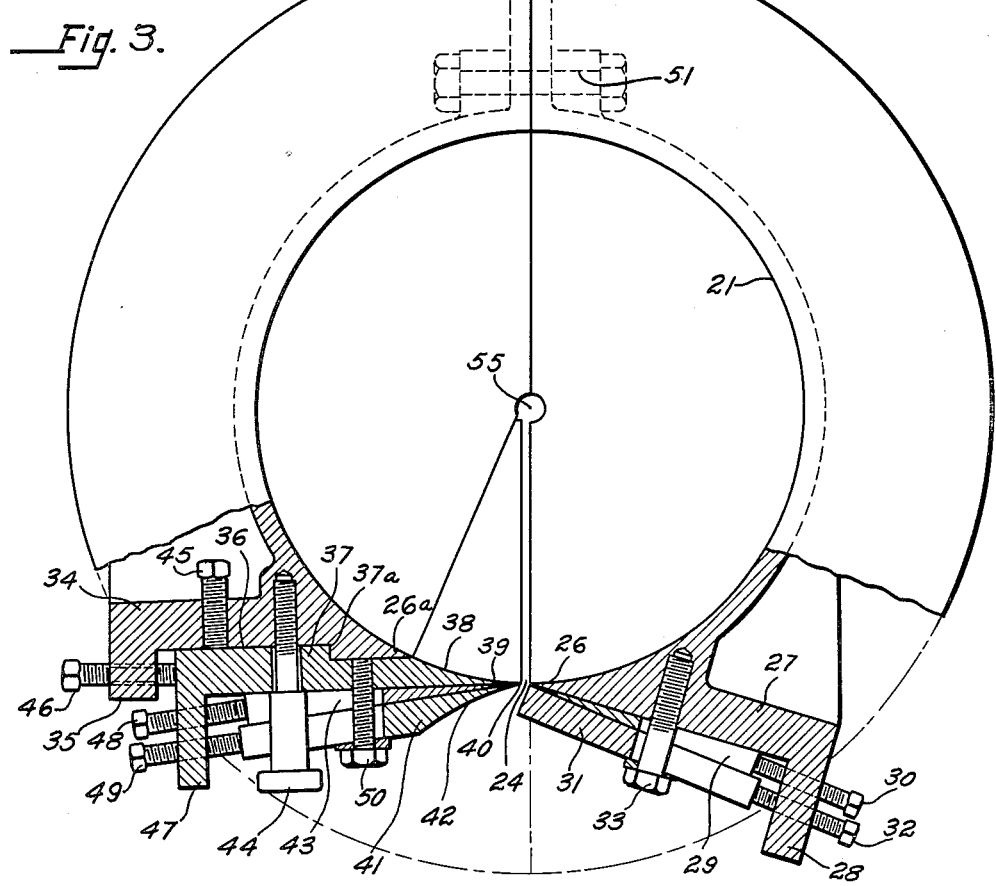
INVENTOR
ROBERT N. HARTZELL.
BY
ATTORNEYS May 1, 1934.  R. N. HARTZELL  1,957,166
CUTTER HEAD FOR VENEER MACHINES
Original Filed Jan. 26, 1931  3 Sheets-Sheet 3

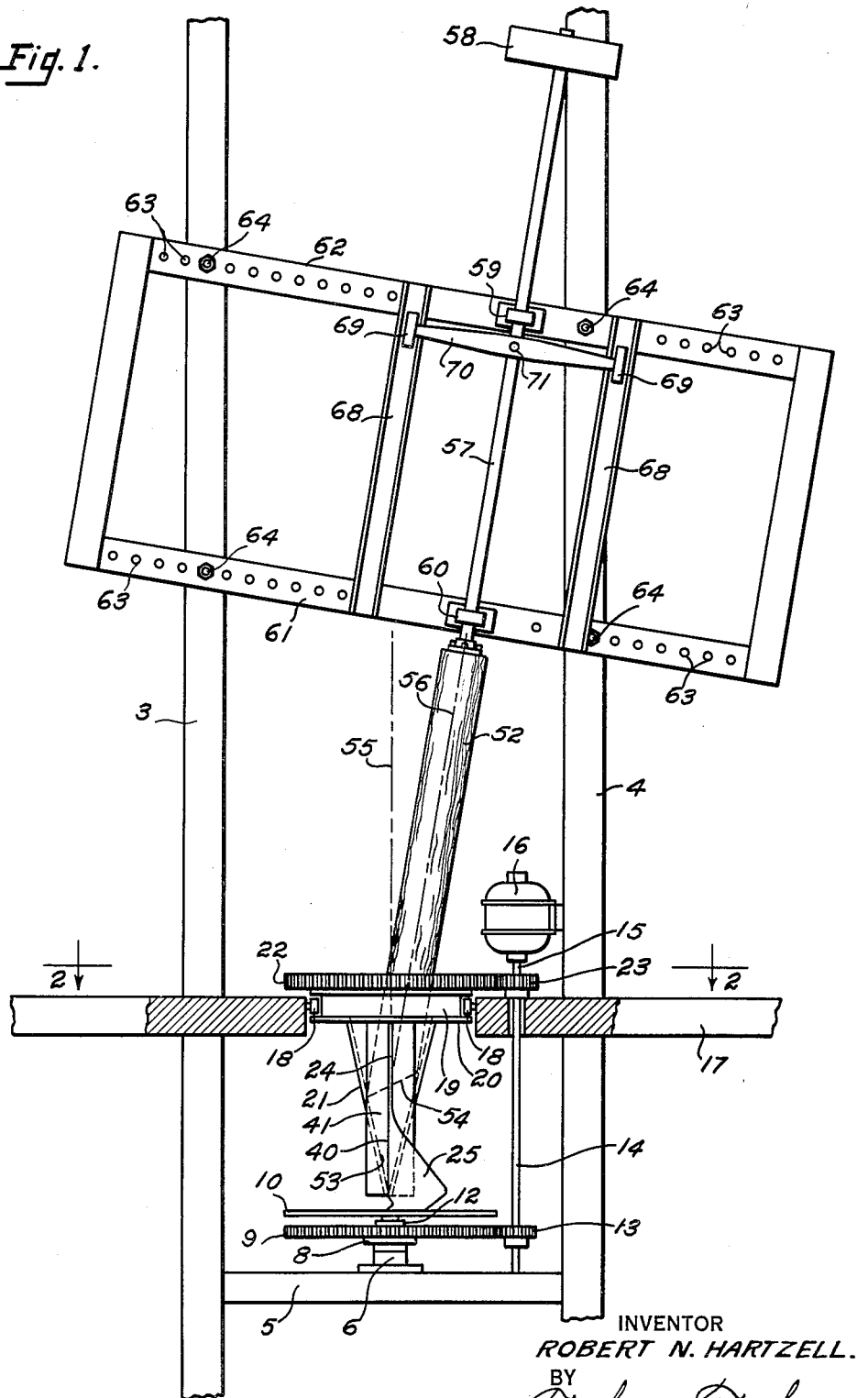

INVENTOR
ROBERT N. HARTZELL.
BY
ATTORNEYS

Patented May 1, 1934

1,957,166

UNITED STATES PATENT OFFICE 1,957,166

CUTTER HEAD FOR VENEER MACHINES

Robert N. Hartzell, Piqua, Ohio, assignor to Hartzell Industries, Inc., Piqua, Ohio, a corporation of Ohio Original application January 26, 1931, Serial No. 511,238. Divided and this application December 18, 1931, Serial No. 581,899

5 Claims. (Cl. 144—212)

This invention relates to the process of making veneer and a veneer machine.

It is the object of my invention to provide a machine which will produce from a cylindrical work piece a continuous strip of veneer, the outline of which will be square or substantially square.

It is a further object to provide an apparatus in which the cutter blade is adjustable with respect to the vertical axis of the cutting mechanism. It is adjustable as to depth of cutting; that is, as to the angularity of the cutting and is adjustable to and from the work piece and may be removed with its adjustments bodily for resharpening without disturbing the adjustments.

It is a further object to provide a cutter so associated with the cutter support that any accumulation of the debris within the cutter support, upon removal of the cutter, can be taken through the side of the cutter support.

It is a still further object to provide a bar that is adjustable in and out and laterally in association with the cutter.

This is a division of my application, Serial No. 511,238, filed January 26, 1931, and now Patent No. 1,921,183, Aug. 8, 1933.

Referring to the drawings:

Figure 1 is a side elevation of a stationary work piece and the rotating cutter and rotating table for removing the cut veneer.

Figure 2 is a section on the line 2—2 of Figure 1, looking downwardly in the direction of the arrows.

Figure 3 is a top plan view of the cone support, the cutter and cutter adjusting mechanism, the bar and bar adjusting mechanism.

Figure 4:
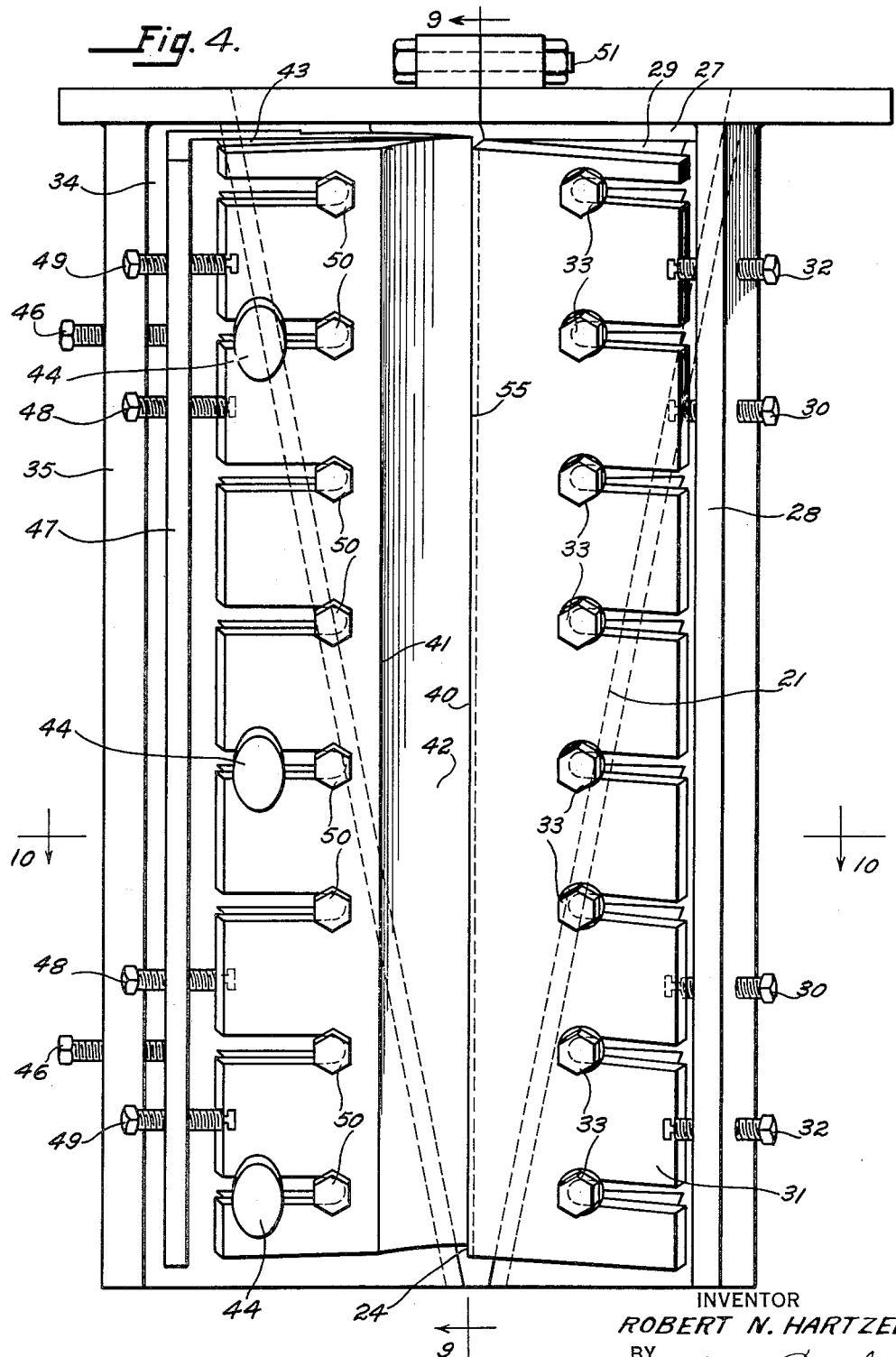
Figure 4 is a side elevation thereof.

Referring to the drawings in detail, 1, 2, 3, and 4 represent standards of a square frame, which standards are interconnected by a platform 5 on which is mounted a bearing 6 in which is inserted a shaft carrying a collar 8 that rests upon the bearing. Mounted on this shaft and collar 8 is a large turntable gear 9. On this turntable is mounted a veneer receiving carrier 10 that is pivotally supported on the small shaft 11 which forms a reduced extension of the above referred to shaft projecting above the gear 9, there being friction plate 12 between the carrier 10 and the gear 9 so that any necessary lag between the motion of the gear and the motion of the plate 10 may be accommodated. The gear 9 is driven by the pinion 13 on the shaft 14, which shaft is connected to the armature shaft 15 of the driving motor 16. This motor may be mounted upon one of the standards 1, 2, 3 or 4, or any connections therebetween.

Also mounted on these standards is a frame designated 17, which is provided with a plurality of rollers 18 that travel within a groove 19 of a track having side rails 20. These rollers serve as the roller bearing supports and thrust bearings for the cutter supporting cone 21, that is attached to and is formed as a part of the track 20. Mounted on the upper side of this track is a driving gear 22 which is driven by a pinion 23 on a shaft 14. Thus the cone and veneer support are driven synchronously with the friction clutch 12 therebetween for relative slippage when that is necessary to accommodate the supporting and arrangement of the veneer that is cut from within the cone.

The cutter supporting cone is provided with a vertical slot 24 in one wall thereof through which the veneer strip 25 makes its exit and thence descends upon the table 10.

This cone 21 has its walls formed adjacent the slot 24 tapered, as at 26 and 26a. At 26 this tapered wall is continued into an angular bracket having portion 27 the outer face of which is substantially tangential to the cone 21 and portion 28 that is at right angles to the portion 27.

Mounted in sliding engagement with the outer face of the tangential portion 27 of the bracket is a slidable wedge 29 which is adjusted inwardly and outwardly by the adjusting screw 30 that is carried in the angular bracket portion 28. Mounted upon the outer face of this wedge and projecting into a point close to the opening 24 is a guide bar 31, which is likewise adjusted by a screw 32 in the angular arm 28 of the bracket. Both the wedge 29 and the bar 31 are retained in position by the attaching bolt 33 which is carried by the bracket portion 27 of the bar bracket.

On the other side of the opening 24 is a knife bracket which is an extension of the surface 26a. This bracket portion is designated 34 and the angular portion thereof is designated 35. It is provided with a recessed face 36 for receiving a knife holder. The knife holder 37 has an arcuate inner face 38 that conforms with the curvature of the inside of the cone 21. It terminates in a sharp edge 39 which is overlapped by the sharp edge 40 which constitutes the knife edge of the knife 41, the outer face of which projecting from this edge is an arcuate surface 42. This knife rests upon a wedge 43 that is interposed between the knife 41 and the knife support 37. The knife and wedge are locked onto the cone bracket 34 by the locking screws 44.

The entire assembly including the knife is adjusted for pitch by the pitch screw 45 carried by the bracket 34 and engaging the back of the knife support 37. The mount of the knife support 37 is controlled by the set screw 46 which forces the knife holder 37 and its shoulder 37a against the corresponding shoulder of the recess 36 on the bracket 34. The end of the screw 46 engages the angular end 47 of the knife support 37 while the screw itself 46 is carried on the angular extension 35 of the bracket 34.

Carried on the angular extension of the knife support 37 is an adjusting screw 48 for adjusting the wedge 43 and another adjusting screw 49 for adjusting the knife 41.

It will be apparent that the entire assembly of the knife, wedge and knife support may be removed from the bracket 34 by detaching the screw 44 and loosening the screw 46 as the locking bolt 50 retains the knife and wedge and knife support together as a unit. Thus the knife may be honed and sharpened. When this is done the entire space from the surface 26 to the surface 26a is opened throughout the side of the cone for clearing any refuse that may have accumulated.

For convenience the cone itself is made in halves, which are attached together by the bolts 51.

Turning to the work piece and its support I designate the work piece which may be a log that has a tapered nose 53 by the numeral 52. The line of the junction between the surface of the log and its tapered nose, which also defines the line on which the knife passes over the surface of the log 52, is the line 54 which becomes one of the substantial straightedges of the resulting four sided strip of veneer that forms a four-sided, substantially straightedge plate of veneer as cut from the work piece. (See Figure 5 in the above referred to copending application).

The axis of the rotating cone is designated 55. The axis of the work piece is designated 56. These axes intersect within the cone and within the work piece at the working end. The work piece is pressed downwardly against the cutter within the cone by the shaft 57 attached to the end of the work and on which is a weight or any other suitable device for exerting pressure designated 58. The shaft is guided in the eyes 59 and 60 in which it is mounted loosely. These eyes are mounted on the cross frame members 61 and 62 that are adjustably mounted through apertures 63 and pins 64 between the uprights 1, 2, 3 and 4. Mounted on the frame members 61 and 62 are vertically disposed tracks 68 in which travel rollers 69 on the ends of the cross arm 70 fastened by the set screw 71 on the shaft 57. This structure constitutes a guide for the work piece to determine its angularity with respect to the cutting devices.

In the veneer product which results from the above process and apparatus, it will be noted that a continuous strip of veneer is cut from the work piece as it progresses, there being approximately four revolutions of the rotating cone or of the rotating work piece to form a complete plate of veneer that is to form a piece of veneer with the outside edges of the plate thus formed substantially straight, as at 54, which is the line of severance between the tapered nose and the cylindrical surface of the work piece 56 as the knife 41 passes along the line 54. Consequently any configuration in the wood that constitutes a design is perfectly duplicated in each quadrant of the resulting plate of veneer, because it represents a veneer strip taken off the same portion of wood in succession so that the matching is perfect.

It will be observed that my process consists in placing the axis of the work piece at an angle to the axis of the cone; it further consists in having the knife and bar with their edges in the plane of the cone, such plane passing through the axis of the cone; or stated in another manner, the edge of the knife 42 and the edge of the bar 31 lie in a radial plane in which the cone axis also lies, but such edges are arranged at an angle with the axis of the cone support so that they lie parallel to an element in the surface of the conical end of the work piece 52 or in other words, they lie in the surface of the interior of the cone support 21.

Stating this invention in another way, the mechanism and method of this invention consist of a knife supporting cone having the vertical axis 55 with a knife adjacent a vertical slot 24 in the side wall of the cone the edge of the knife having the same angularity as the cone wall with respect to the cone axis and the work piece, the nose of which fits within said cone support, but the body of which is positioned so that its axis is at an angle to the cone axis, such axes intersecting within the work piece and the cone at the base thereof. The axis 55 and the surface of the cone of the work piece intersect substantially the apex of the cone.

It will be understood that I desire to comprehend within my invention such modifications as may be clearly embraced within the scope of my claims and invention.

Having thus fully described my invention, what I claim as new and desire to secure by Letters Patent, is:

1. In a veneer cutter, a conical support having a side slot, a knife support having an edge projecting through said slot onto the surface of the cone, a knife on said support, means to laterally adjust the position of said knife, and means to adjust the support.

2. In combination, a conical support having a vertical side slot, a knife plate having an edge mounted therein adjustably, a bar mounted adjacent the other edge of said slot and mounted adjustably, said knife and bar having interposed between each of them and said cone support adjustable wedges, and means for adjusting said knife and bar inwardly and outwardly independent of said wedges.

3. In combination, a conical support having a side slot, a bracket, a knife support mounted thereon, a wedge mounted on said support a knife mounted on said wedge and support, means for adjusting said knife and said wedge inwardly and outwardly, and means for adjusting the pitch of said knife.

4. In combination, a conical support having a side slot, a bracket, a knife support mounted thereon, a wedge mounted on said support, a knife mounted on said wedge and support, means for adjusting said knife and said wedge inwardly and outwardly, means for adjusting the pitch of said knife, a second oppositely disposed bracket on the other side of said slot, an inwardly and outwardly adjustable wedge mounted thereon, and an inwardly and outwardly adjustable bar mounted on the wedge and one of said brackets whereby said bar and said knife may be adjusted with respect to said slot.

5. A new article of manufacture for use as a veneer cutter, a conical support having a slot in one side, an angular knife support on said support and having an arcuate inner end in said slot, a slidable wedge mounted thereon, a slidable knife mounted thereon and means for adjusting said wedge and said knife and means for retaining said wedge and said knife on the knife support in their adjusted positions.

ROBERT N. HARTZELL.